(No Model.)
F. M. SPEED.
PIPE MACHINE.
No. 437,871. Patented Oct. 7, 1890.
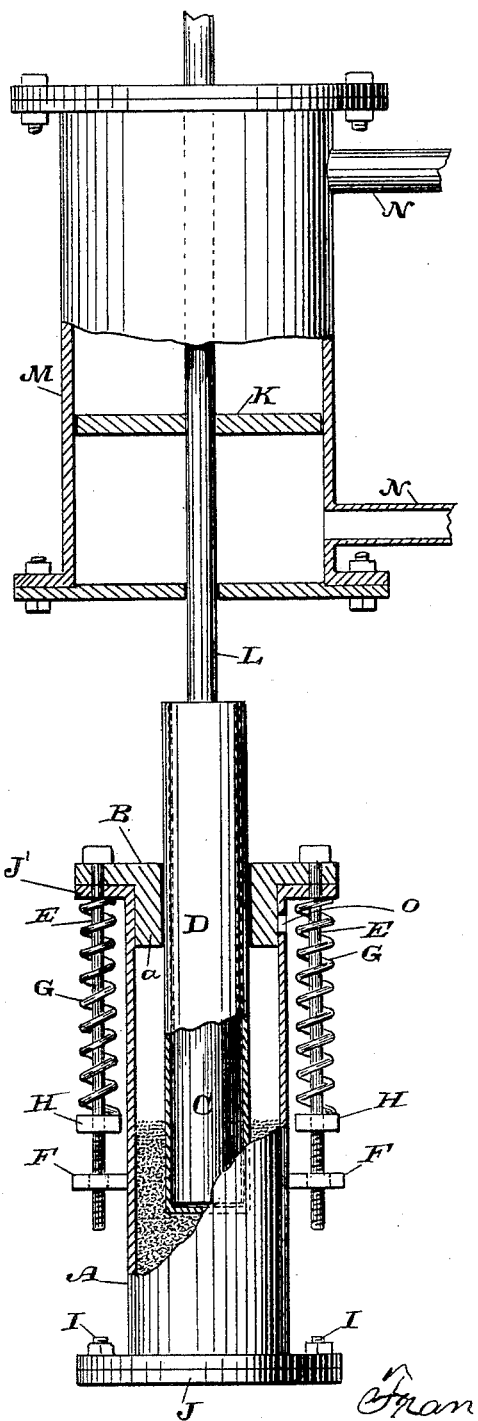
Witnesses,
Geo. H. Strong.
J. H. Housey
Inventor,
Francis M. Speed
By Dewey & Co.
Attys

UNITED STATES PATENT OFFICE.

FRANCIS M. SPEED, OF SAN FRANCISCO, CALIFORNIA.

PIPE-MACHINE.

SPECIFICATION forming part of Letters Patent No. 437,871, dated October 7, 1890.

Application filed January 11, 1890. Serial No. 336,683. (No model.)

*To all whom it may concern:*

Be it known that I, FRANCIS M. SPEED, a citizen of the United States, residing in the city and county of San Francisco, State of California, have invented an Improvement in the Manufacture of Pipe; and I hereby declare the following to be a full, clear, and exact description of the same.

My invention relates to certain improvements in the manufacture of pipe, and it is especially applicable to the manufacture of pipe from material which is first made plastic by heat, so that the pipe can be made from it and the material afterward allowed to solidify.

It consists in a process of making pipe from the plastic material by the displacement of the material within the mold or apparatus, a means for producing an automatic pressure upon the material of which the tube is formed while it is still in its plastic condition, and in certain details of construction, which will be more fully explained by reference to the accompanying drawing, in which—

The figure shows a vertical sectional elevation of an apparatus adapted to manufacture my pipe.

In the manufacture of my pipe I have herein described an apparatus which is adapted to make the pipe out of asphaltum, combined with other material, which will produce a tough composition less brittle than pure asphaltum, but capable of being made plastic by heat and of becoming solid when again cold. Such a composition may be made by mixing sawdust or other suitable finely-divided material with the asphaltum.

To carry out my invention I employ an exterior casing A, made of metal and having flanges at the opposite ends. Upon one of these ends is a cover J, which is fixed in place by bolts I, or clamps, or other suitable locking devices, thus forming a rear or closed end of the mold. The opposite end has a head or cover B, which has an inwardly-projecting gland *a*, extending into the cylinder A a short distance. The central portion of the head or cover B has a hole in it of sufficient diameter to admit the plunger C, the diameter of which is equal to the interior diameter of the pipe which is to be formed. Surrounding this plunger C is a sheath or casing D, which fits snugly upon it, and which is intended to remain within the pipe after it is formed and until it has become sufficiently hard to allow the sheath to be removed.

The cap or head B fits upon the upper flange of the casing A, and is retained in place by bolts E, which, as here shown, pass down through the cover and the upper flange, and also pass through guiding-lugs F, fixed to the side of the cylinder. Surrounding these bolts E are the springs G, the upper ends of which press against the lower sides of the flange J' of the cylinder or casing A, and the opposite ends of the springs press against the nuts H.

The lower ends of the rods E are screw-threaded, and the nuts H may be screwed upon them, so as to compress the springs G as much as may be found desirable or necessary, and as they act between the flange J' of the cylinder-head and the nuts H it is manifest that they will draw the head or cap B as tightly upon the end of the cylinder as may be desired. The object of these springs and the movable head will be hereinafter described.

L is a piston-rod, which is connected with or forms a continuation of the plunger C.

K is a piston fixed to this rod and fitted to move within the cylinder M. This cylinder is provided with inlet and outlet pipes N and with any suitable arrangement of valves for the purpose of admitting and exhausting steam, air, water, or other medium under pressure, by which the piston K and the piston-rod and plunger may be actuated.

The space between the plunger C and the side of the exterior cylinder or casing A is equal to the thickness of the pipe to be made, and it will be manifest that when a suitable amount of plastic material has been introduced into the cylinder A and the plunger C is afterward forced down into this material, the material will be displaced and rise up around the plunger, while the plunger moves to the bottom of the cylinder, thus forming a complete pipe, which surrounds the plunger, the latter forming a core for the pipe, and the cylinder the exterior casing therefor.

The operation of my device will then be as follows: The plunger C is withdrawn from the cylinder A, and a sufficient amount of the plastic material is placed within the cylinder A, so that when the plunger has been forced to the bottom of the cylinder the material will, as before described, be displaced and uprise around it and fill the space within the cylinder and around the plunger, so as to form a complete pipe-section. I place a little more of the material in the cylinder than will suffice to form the tube, and when the plunger C has been forced nearly to the bottom of the cylinder A the material will have risen so as to press against the gland $a$ of the movable cylinder-head B and will force it outward. The tension of the springs G, however, resist this effort, and consequently produce a pressure upon the plastic material of which the tube is formed, thus compressing and compacting it. In order to allow a surplus to escape if there should be more material in the cylinder than was necessary for the purpose, I have shown holes or openings O in the side of the cylinder and just beneath its upper flange J', so that when the gland $a$ has been forced out of the cylinder as far as desirable to produce the requisite pressure upon the material of which the pipe is formed any surplus may be forced out through these openings as the plunger C passes down to the bottom of the cylinder, and while this surplus is allowed to escape the action of the springs will produce the proper compression upon the pipe, which remains within the cylinder, this action being constant and automatic and depending upon the tension which is given the springs. After the pipe is formed the plunger C may be withdrawn, leaving the sheath D within the pipe, so as to maintain its proper shape until it becomes thoroughly cold and solid. After this the sheath may be removed from the pipe and the pipe taken out of the cylinder.

Having thus described my invention, what I claim as new, and desire to secure by Letters Patent, is—

1. A pipe-forming apparatus consisting of an exterior-closed cylinder having a detachable and a movable head, a plunger passing through the movable head, and a mechanism by which said plunger is forced into the plastic material contained within the cylinder, so as to displace it and cause it to flow up around the plunger and fill the cylinder, guide rods or bolts by which the movable head is held in place, and adjustable tension-springs surrounding said bolts, so as to be compressed and exert a pressure upon the head when it is forced away from the end of the cylinder by the contained material, substantially as herein described.

2. A pipe-forming apparatus consisting of an exterior cylinder having a fixed head, a movable head having a gland extending into the opposite end of the cylinder, and a plunger passing through a central opening in said gland, adjustable springs pressing upon the head and gland, so as to hold them in place with a yielding pressure, whereby the pipe material is compressed within the cylinder and around the plunger, substantially as herein described.

3. A pipe-forming apparatus consisting of an exterior cylinder having a fixed head, and a movable head with a gland which extends into the body of the cylinder, a plunger passing centrally through said gland and adapted to form a core for the tube within the cylinder, springs by which the movable head and gland are held in place with a yielding pressure, and a discharge opening or openings through which surplus material may flow out of the cylinder when the tube is formed, substantially as herein described.

In witness whereof I have hereunto set my hand.

FRANCIS M. SPEED.

Witnesses:
S. H. NOURSE,
GEO. H. STRONG.